(12) United States Patent
Yamaji et al.

(10) Patent No.: US 7,637,530 B2
(45) Date of Patent: Dec. 29, 2009

(54) AIRBAG DEVICE

(75) Inventors: Naoki Yamaji, Moriguchi (JP); Hidetaka Azuma, Kyoto (JP)

(73) Assignee: Ashimori Industry Co., Ltd., Osaka (JP)

( * ) Notice: Subject to any disclaimer, the term of this patent is extended or adjusted under 35 U.S.C. 154(b) by 203 days.

(21) Appl. No.: 10/543,717

(22) PCT Filed: Jan. 29, 2004

(86) PCT No.: PCT/JP2004/000792
§ 371 (c)(1),
(2), (4) Date: Jan. 11, 2006

(87) PCT Pub. No.: WO2004/067333
PCT Pub. Date: Aug. 12, 2004

(65) Prior Publication Data
US 2006/0175809 A1      Aug. 10, 2006

(30) Foreign Application Priority Data
Jan. 31, 2003   (JP) .............................. 2003-024341

(51) Int. Cl.
*B60R 21/16* (2006.01)
(52) U.S. Cl. .................................. 280/730.2
(58) Field of Classification Search .............. 280/743.1, 280/740, 730.2, 739
See application file for complete search history.

(56) References Cited

U.S. PATENT DOCUMENTS

| | | |
|---|---|---|
| 5,586,782 A | 12/1996 | Zimmerman, II et al. |
| 5,845,935 A | 12/1998 | Enders et al. |
| 6,059,312 A | 5/2000 | Staub et al. |
| 6,086,092 A * | 7/2000 | Hill ............................ 280/729 |
| 6,213,499 B1 | 4/2001 | Khoudari et al. |
| 6,254,121 B1 * | 7/2001 | Fowler et al. ............... 280/729 |
| 6,402,190 B1 | 6/2002 | Heudorfer et al. |
| 7,264,269 B2 * | 9/2007 | Gu et al. .................. 280/730.2 |
| 7,281,734 B2 * | 10/2007 | Abe et al. ................... 280/729 |

FOREIGN PATENT DOCUMENTS

DE    199 30 157 A1    1/2001

(Continued)

*Primary Examiner*—Faye M. Fleming
(74) *Attorney, Agent, or Firm*—Sughrue Mion, PLLC

(57) ABSTRACT

In an air bag device 1 against a side collision which can be expanded and spread out in a gap between an outside portion of a seat of a vehicle and a wall opposite thereto owing to gas generated by an inflator 20 in emergency situations so as to obtain the air bag device at a low cost which system is provided with plural air chambers having difference in expansion timing and pressure depending on portions of a body of a crew, an air bag 10 is structured by a lower air chamber 12 provided with the inflator and an upper air chamber 14, a partition unit 40 for partitioning the lower air chamber 12 and the upper air chamber 14 is structured by a cloth sewn to the air bag, and a communication hole 40e which introduces gas from the inflator 20 from the lower air chamber 14 into the upper air chamber and is closed when subjected to pressure of the upper chamber as the pressure of the lower air chamber is reduced is formed in the cloth.

9 Claims, 3 Drawing Sheets

FOREIGN PATENT DOCUMENTS

| | | |
|---|---|---|
| EP | 0 810 125 A | 12/1997 |
| JP | 51118231 | 10/1976 |
| JP | 92901/1991 | 6/1993 |
| JP | 542001 U | 6/1993 |
| JP | 9-188216 A | 7/1997 |
| JP | 09188216 A | 7/1997 |
| JP | 10081191 A | 3/1998 |
| JP | 10-100827 A | 4/1998 |
| JP | 10100827 A | 4/1998 |
| JP | 11157407 A | 6/1999 |
| JP | 2000289559 A | 10/2000 |
| JP | 2001-239905 A | 9/2001 |
| JP | 2001239905 A | 9/2001 |
| JP | 2003501303 A | 1/2003 |
| JP | 2004-90906 A | 3/2004 |
| JP | 2004090906 A | 3/2004 |
| JP | 2004210048 A | 7/2004 |

* cited by examiner

FIG. 2
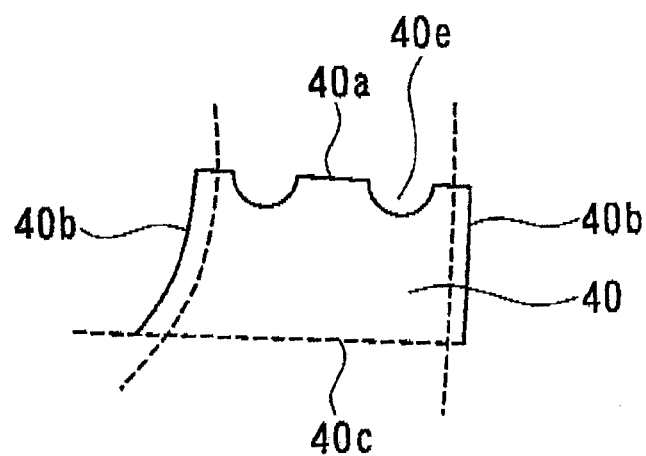
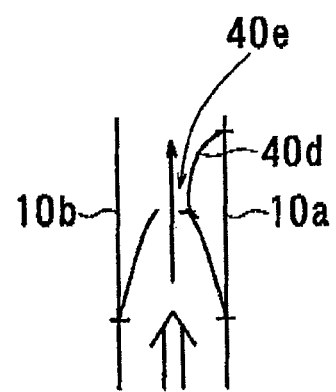
FIG. 3A
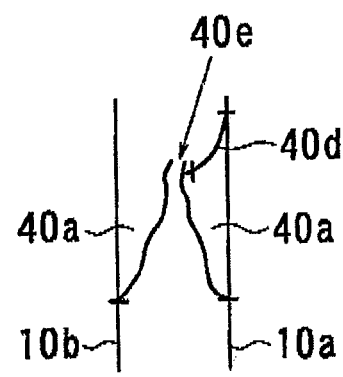
FIG. 3B
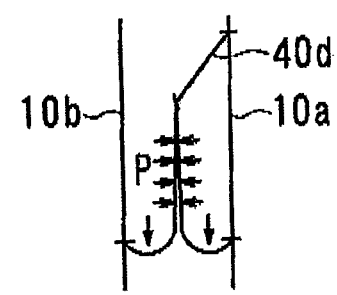
FIG. 3C

AIRBAG DEVICE

TECHNICAL FIELD

The present invention relates to an air bag device, in particular, to an air bag device incorporating an air bag comprising a first air chamber provided with an inflator, a second air chamber into which gas of the inflator is introduced from the first air chamber, a partition unit formed of cloths provided with a communication hole for partitioning the first and second air chambers, wherein when the air bag is spread out and expanded, air pressure inside the first air chamber is differentiated from that inside the second air chamber.

BACKGROUND TECHNOLOGY

An air bag device, for example, an air bag device against a side collision has been conventionally structured to expand in its entirety at a time.

It has been known that the waist of a crew sitting down first comes into collision with a vehicle's door to be then subjected to an impact, and the chest of the crew subsequently comes into collision with the vehicle's door. However, when trying to sufficiently absorb energy at the time of the side collision, such a structure as described has turned out inadequate particularly for protection of only the waist, first and foremost, having therefore failed to provide a satisfactory countermeasure against the side collision.

There has been known an air bag device against a side collision (refer to Japanese Patent No. 2933894) developed under the circumstances, incorporating an air bag having two air-chambers integral with each other, comprising a lower air bag corresponding to the waist of a crew, on a side of the crew, facing a vehicle body, and an upper air bag corresponding to the chest of the crew, on the side of the crew, facing the vehicle body, wherein a partition wall provided between the upper air bag and the lower air bag has a pressure control valve interposed therebetween, thereby causing the lower air bag to be expanded ahead of the upper air bag.

With the above-described air bag device against the side collision, the air bag against the side collision expanded in a vertical direction from seat cushion side parts is first inflated up to the height of the waist of the crew, thereby protecting the waist of the crew, and continues to be spread out up to the height of the chest of the crew.

However, if attention is focused on not only the waist, and chest, but also on the head of the crew when using the air bag against the side collision, while there is, for example, the need for a portion of the air bag, corresponding to the waist, reaching a peak pressure before the elapse of 4 ms from expansion of the air bag against the side collision, and thereafter, being quickly reduced in pressure, thereby mitigating a repellent force of the air bag against the side collision, applied to the waist, a portion of the air bag, corresponding to the head, needs to keep pressure at a peak value even after the elapse of 12 ms to thereby securely hold the head, so that, in practice, it is necessary not only to differentiate simply in timing for expansion between the respective portions of the air bag against the side collision, but also to differentiate in pressures after the expansion between the respective portions of the air bag, corresponding to respective parts of the body of the crew. Nevertheless, with the conventional air bag device, it is impossible to differentiate in pressure between the upper air bag, and the lower air bag.

Accordingly, with the structure described, there is a problem in that the pressures of the respective portions of the air bag, after the expansion thereof, cannot be optimally adjusted so as to correspond to the respective parts of the body of the crew.

Accordingly, there has been proposed an air bag device (refer to paragraph numbers [0021], [0022] and FIG. 1 of JP 10-100827A) wherein a partition wall having a communicating part is provided inside a bag-like body of the air bag device, and while the bag-like body is partitioned into first and second chambers, that is, upper and lower ones, there is provided a check valve structured such that an edge of a thin film, at both ends thereof, is fixedly attached to the upper face of the partition wall in such a way as to cover the communicating part, and when gas of the lower chamber flows into the upper chamber, a midpoint part of the check valve is bulged upward in a arch-like state owing to pressure of the gas flowing from the lower chamber into the upper chamber through the communicating part, thereby releasing the check valve so as to allow the gas of the lower chamber to flow into the upper chamber, however, upon addition of out-flow pressure of the gas from the upper chamber to the lower chamber, the communicating part is blocked by the midpoint part of the check valve, thereby blocking out-flow of the gas from the upper chamber to the lower chamber.

With the air bag device described as above, however, there are the needs for separately fabricating the check valve, and attaching it to the partition wall in size large enough to allow the check valve to be attached thereto, causing problems such as an increase in a component count, inability of securing the communicating part in a shape requiring a small gas path, and so forth.

The present invention has been developed to solve those problems described above.

It is a first object of the present invention to effectively protect a crew by allowing plural air chambers to be differentiated in pressure with a simple structure in an air bag comprising plural air chambers needing different characteristics.

It is a second object of the present invention to prevent gas from back-flowing from a second air chamber to a first air chamber utilizing a cloth without needing components such as a pressure adjustment valve fabricated separately as made conventionally, reducing cost of an air bag device.

It is a third object of the present invention to effectively protect a body of a crew at the time of collision by providing a flow path of gas for expansion of the air bag.

DISCLOSURE OF THE INVENTION

1. An air bag device provided with an air bag-like body comprising a first air chamber, a second air chamber, and a diffuser interposed between the first and second air chambers and having first and second communication holes for portioning out gas from an inflator to the first and second air chambers, respectively, wherein when pressure inside the diffuser becomes lower than pressure inside the first air chamber or pressure in the second air chamber, at least one of the first and second communication holes is closed owing to a difference in pressure therebetween, and wherein the diffuser and a partition unit for partitioning the first and second air chambers are integrally formed, so that the structure of the air bag can be simplified.

2. In the air bag device described in the first invention, the present invention is structured such that the diffuser is provided with the partition unit comprised of cloths between itself and at least one of the first and second air chambers, and the partition unit introduces a gas from the inflator into the first or second air chamber, and has the communication holes which are closed by the cloths forming the partition unit owing to a difference in pressure between itself and the first or second air chamber when the pressure inside the diffuser is lowered.

3. An air bag device of the present invention having an inflator for generating gas in emergency situations so as to be expanded and spread out by generated gas, wherein an air bag comprises cloths which have been sewn to the top face side, and rear face side thereof, and the cloths are folded toward a second air chamber between a first air chamber provided with the inflator and the second air chamber, between both chambers, side portions other than the folded portion are sewn to the cloths on the top face side and rear face side thereof, and a partition unit including a part of the folded part is provided, and wherein the partition unit is provided with a communication hole which is closed by the cloths forming the partition unit owing to a difference in pressure between the diffuser and the second air chamber.

Since the present invention is structured by the air bag device described in the second and third inventions, the air bag having different pressures can be realized, thereby setting the air bag device depending on the protection characteristics of a body of a crew and the partition unit and the communication hole closing means of the partition unit can be structured by the cloths, and hence the air bag device can be fabricated with ease so that a low-priced air bag device can be provided.

4. In the air bag device described in the third invention, the present invention is structured such that the diffuser for rectifying flow of the gas from the inflator in the direction of the partition unit is provided in the first air chamber, and the diffuser supplies gas to the second air chamber more than it supplies gas to the first air chamber, and wherein the provision of the diffuser can effectively let the gas to flow out toward the upper air chamber at the outset of spreading thereof, thereby hastening spreading out of the gas toward the upper air chamber.

5. In the air bag device described in a fourth invention, the present invention is structured such that the partition unit is continuously and integrally formed with the diffuser, and a second communication hole which is smaller than that of the partition unit for supplying gas to the first air chamber is provided in the diffuser. Since the partition unit is continuously and integrally formed with the diffuser, a component count is reduced, so that the air bag device can be fabricated with more ease. Further, it is possible to adjust flow of the gas to the first and the second air chambers by the size of the second communication hole.

6. In the air bag device described in any of the second to fifth inventions, the present invention is structured such that a volume of the first air chamber is smaller than that of the second air chamber so that the first air chamber serving as a protection portion relative to a waist which is relatively easily specified in a protection range can be minimized while the second air chamber which is difficult in specification of the protection range is made large, thereby protecting a crew with reliability.

7. In the air bag device described in any of the second to sixth inventions, the air bag device of the present invention is structured such that an exhaust port is provided in the first air chamber so that when the pressure at the waist of a crew is abruptly lowered, a repellent force of the air bag acting on the waist is mitigated, thereby preventing an unexpected damage to be applied to the waist of the crew.

8. In the air bag device described in any of the second to seventh inventions, the present invention is structured such that the cloths on the top face side and the rear face side forming the air bag are sewn to one another so as to form guide paths in such a way that gas flown in the second air chamber is guided from a rear side of a vehicle into an upper portion thereof, and further from the upper portion to the front portion thereof, thereby eliminating a danger that an arm of the crew is come off from the air bag when the arm is restrained from the lower side at the time of the side collision, and a head of a crew can be protected in a condition where the arm is fixed so that the safety at the time of the side collision can be further improved.

Further, according to the present invention, the following operations can be effected.

The second air chamber is expanded until it reaches the same pressure as a peak pressure inside the first air chamber by gas which is introduced from the first air chamber into the second air chamber through the communication hole of the partition unit or reaches a pressure exceeding the peak pressure owing to the rectification by the diffuser. Even if the pressure inside the first air chamber is lowered thereafter, the gas once guided to the second air chamber is not returned to the first air chamber at the inflator side owing to a checking function of the partition unit, thereby realizing the air bag device provided with two air chambers having different pressure therein.

In the case where the second air chamber is expanded when gas flows from the first air chamber into the second air chamber through the communication hole in emergency situations, the partition unit are subjected to pressure applied from the side face thereof owing to this gas pressure, so that the side faces are brought into intimate contact with one another, causing the communication hole to be closed. However, during the pressure inside the first air chamber being high or during gas being flown from the diffuser, the gas flows into the second air chamber through the communication hole while releasing the state where the side faces of the partition unit being brought into intimate contact with one another. However, when the gas pressure inside the first air chamber becomes lower than that of the second air chamber, the side faces of the partition unit are subjected to pressure to be brought into intimate contact with one another, so that the communication hole is closed. At this point in time, since both side portions of the partition unit are sewn together with the cloths on the top face side and the rear face side, they are not reversed toward the inflator side and also since the folded part is continuous with the cloths at least at a part thereof, gas is guided to the direction to close the communication hole.

When gas is supplied to the second air chamber more than it is supplied to the diffuser, the second air chamber can be spread out earlier even if it is larger than the first air chamber.

For example, in the air bag against the side collision, provided that the first air chamber serves as a waist protection portion, since an exhaust port for letting a pressure to escape is provided in the first air chamber, it is possible to effectively adjust the pressure reduction. On the other hand, when the pressure inside the first air chamber is reduced, the communication hole is closed by the difference in pressure between the first air chamber and the second air chamber, so that the upper and the lower air chambers are cut off. As a result, since the pressure inside the second air chamber is kept, it is possible to set the air chambers to different pressure characteristic at the waist protection portion and at the other protection portion including a head protection portion.

Since the exhaust port (communication hole) is provided in the first air chamber, the pressure at the waist protection portion can be quickly reduced, it is possible to mitigate a repellent force against the crew caused by the air bag when the air bag operates.

Since the gas introduction paths is provided so as to wrap around the air bag from the back side, the upper side toward the front side thereof when the air bag is sewn, the air bag rises in a strut-shape at the rear side of the vehicle when it is spread out, so that the air bag can be spread out smoothly.

BRIEF DESCRIPTION OF DRAWINGS

FIG. 2 is an enlarged view of a partition unit shown in FIG. 1;

FIGS. 3A to 3C are sectional views of the partition unit shown in FIG. 1, as seen in a plane orthogonal to the plane of FIG. 1, in which FIG. 3A shows a condition of equilibrium in pressure between the upper air chamber and the lower air chamber, FIG. 3B shows a condition where pressure inside the lower air chamber is higher than that in the upper air chamber, and FIG. 3C shows a condition where the pressure inside the upper air chamber is higher than that in the lower air chamber.

BEST MODE FOR CARRYING OUT THE INVENTION

An air bag device against a side collision as one embodiment of an air bag device according to the present invention is described hereinafter with reference to the accompanying drawings.

Figure 1:
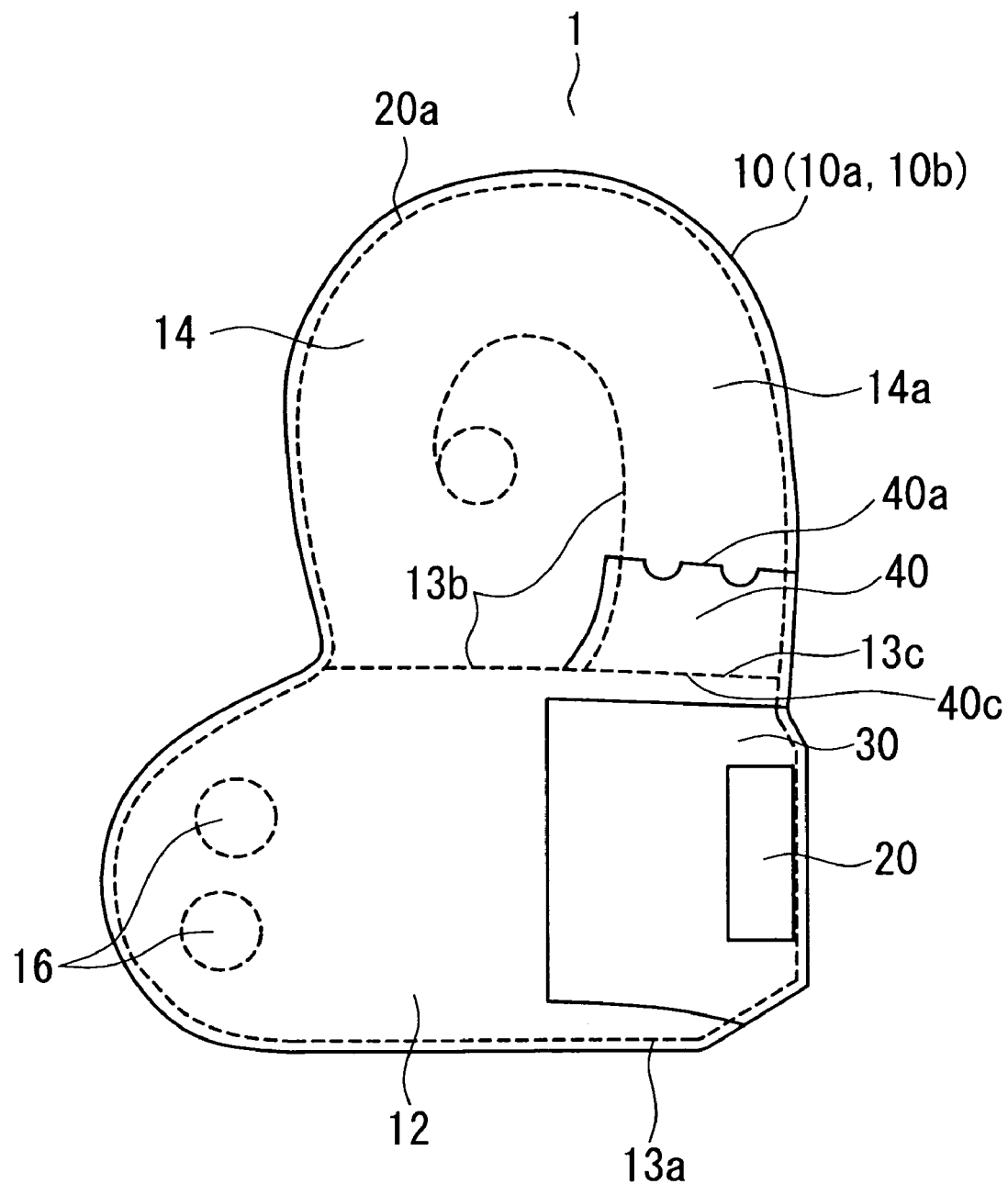
FIG. 1 is a schematic sectional view showing the whole makeup of one embodiment of an air bag device according to the present invention.

FIG. 1 is a schematic sectional view showing the whole makeup of the air bag device against the side collision.

As shown in the figure, an air bag 10 of the air bag device 1 is formed by sewing together cloths 10a, 10b, on the top face side, and rear face side of the air bag 10, respectively, at a seam 13a along the entire periphery thereof, each being made of, for example, a synthetic fabric such as polyamide, polyester, and so forth, with a resin coating applied thereto, for common use in air bags. Further, the air bag 10 is divided along another seam 13b branching off from the seam 13a, at which the cloths 10a, 10b, on the front, and back sides of the air bag 10, respectively, are sewn together, into a lower air chamber 12 serving as a first air chamber extending laterally, and an upper air chamber 14 serving as a second air chamber narrower in width than the first air chamber, and extending longitudinally. That is, as shown in FIG. 1, the seam 13b is branched off from a left seam 13a and directed toward a right end, then extended upward in the middle thereof, thereafter half-turned while substantially in parallel at a given spacing with an upper end edge of the air bag, subsequently lowered toward the seam 13b, then little turned at the time when spaced at a given spacing to merge with the original seam 13b.

In FIG. 1, there is provided in the upper air chamber 14 along the right end of the air bag, owing to the seams 13a and 13b, a tubular air chamber 14a which is extended upward from the portion communicated with the lower air chamber 12 and curved in a half turned manner, and a partition unit 40, secured by seam 13c and described later, for spacing the lower air chamber 12 and the upper air chamber 14, is formed in the tubular air chamber 14a.

A diffuser 30 formed by doubling a piece of a cloth with a predetermined length and width, and pinching both edges thereof between the cloths 10a, 10b to be subsequently sewn together is disposed on an edge of the lower air chamber 12, on the right-hand side in FIG. 1. The diffuser 30 is preferably made of a cloth higher in heat resistance than the cloths 10a, 10b, and when the gas is jetted out from the inflator 20 disposed inside the diffuser 30, the diffuser 30 rectifies at least a portion of a jet stream of the gas. Further, with the present embodiment, two communication holes (exhaust ports) 16 are provided in the vicinity of an edge of the lower air chamber 12, on the left-hand side in FIG. 1. The exhaust ports 16 are for letting pressure escape, thereby absorbing an impact to the crew.

FIG. 2 is an enlarged view of the partition unit 40 shown in FIG. 1.

As shown in the figure, in this part, there is provided the partition unit 40 formed by folding back a piece of cloth with a predetermined length and width, and causing a folded-back part 40a thereof to be oriented toward the upper side of the air bag, that is, in a direction opposite from the inflator 20, thereby sewing a lower edge 40c thereof, and both side edges 40b thereof, together with the respective cloths 10a, 10b, on the top face side, and rear face side forming the air bag 10.

In the upper edge portion of the folded-back part of the partition unit 40, there are formed communication holes 40e described later (refer to, for example, FIG. 3), for introducing the gas from the inflator 20 into the upper air chamber 14, two of the communication holes being arranged side by side in the case of the present embodiment.

FIG. 3 is a sectional view of the partition unit shown in FIG. 1, as seen in a plane orthogonal to the plane of FIG. 1.

FIG. 3A shows a condition where pressure inside the lower air chamber 12 is higher than that in the upper air chamber 14 at the outset of actuation of the inflator 20, and in this condition, a force causing partition faces to expand toward the outer side thereof comes into action owing to the pressure on the side of the lower air chamber 12, so that the communication holes 40e of the partition unit 40 are opened, thereby causing the gas to flow from the lower air chamber 12 into the upper air chamber 14.

FIG. 3B shows a condition of equilibrium in pressure between the upper air chamber 14 and the lower air chamber 12, and in this condition, pressure on the inner face of a partition wall, and pressure on the outer face of the same are kept in equilibrium, so that there occurs no movement of the gas through the communication holes 40e. This condition exists when, for example, the inflator 20 is not actuated.

FIG. 3C shows a condition where after the pressure inside the lower air chamber has reached the highest level, the pressure thereof has abruptly dropped, thereby causing the pressure inside the upper air chamber to become higher than that in the lower air chamber. In this condition, the partition faces of the partition unit 40 are subjected to pressure applied from the outer side thereof owing to the pressure on the side of the upper air chamber 14, so that the partition faces are brought into intimate contact with one another, and consequently, the communication holes 40e of the partition unit 40 are closed, thereby effecting cutoff between the air chambers 12, 14. That is, the partition unit 40 functions as a check valve.

Further, reference numeral 40d denotes a tether binding the upper edge portion of the folded-back part of the partition unit 40 to one of the cloths making up the air bag 10. Since the tether 40d fulfills a function of preventing the partition unit from flipping over when the pressure inside the upper air chamber becomes higher than that in the lower air chamber. The tether can be dispensed with in the case of the present embodiment wherein all parts of the partition unit, except the folded-back part thereof, are sewn to the cloths making up the air bag.

Now, there will be described hereinafter operation of the air bag device 1 against the side collision, according to the present embodiment of the present invention.

The air bag device 1 against the side collision, according to the present embodiment, is held at a suitable position such as within a seat cushion material, and so forth, and when an impact due to a collision is added to the side of a vehicle, an impact sensor (not shown) detects the impact, thereby sending an activation signal for causing the air bag to spread out to the inflator. In response to the activation signal, the inflator jets out the gas.

At this point in time, the gas jetted out from the inflator is rectified by the diffuser 30 and is jetted out into the lower air chamber 12 to expand the lower air chamber 12, and a part of the gas proceeds toward the upper air chamber 14, and subsequently introduced into the upper air chamber 14 through the above communication hole 40e, provided in the partition unit 40.

The upper air chamber and the lower air chamber are expanded when the inflator 20 operates as mentioned above. Here, the exhaust ports 16 are provided in the vicinity of the edge of the lower air chamber 12 on a side of the lower air chamber 12, opposite from the inflator 20, and a jet stream of the gas from the inflator 20 is caused to flow out to outside through the exhaust ports 16, thereby adjusting the pressure inside the lower air chamber 12 so as to able to effectively protect the waist of the crew. This is intended to abruptly lower the pressure inside the lower air chamber, owing to jetting of the gas from the inflator 20, thereby rapidly mitigating a repellent force against the waist of the crew for effecting protection of the waist.

On the other hand, on the side of the upper air chamber 14, since the pressure inside the lower air chamber is higher than that inside the upper air chamber at the outset of actuation of the inflator 20, and the gas is caused to flow in by the agency of the diffuser, a portion of a jet stream of the gas from the inflator 20 is introduced into the upper air chamber 14 through the communication hole 40e of the partition unit 40, as shown in FIG. 3B, thereby causing the upper air chamber 14 to undergo expansion.

The gas introduced into the upper air chamber 14 flows first upward along the tubular air chamber 14a of the upper air chamber 14 and subsequently flows downward from the front side. Accordingly, portions of the upper air chamber 14 undergo expansion in sequence, starting from portions thereof, adjacent to the lower air chamber 12, along the arms of the crew, followed by the shoulder, and then, along the temple of crew. In other words, upon occurrence of a side collision, the waist of the crew is first protected, and subsequently, a protection region of the air bag is enlarged to the portions thereof, along the arms of the crew, the shoulder, and then, the temple of crew, in that order, so that the waist, the arms, and the head of the crew can be secured in that order, thereby implementing the safest protection thereof.

During that period of time, the pressure of the gas introduced into the upper air chamber 14 is acting on the partition unit 40 from the outside thereof, and the pressure of the gas, from the side of the lower air chamber 12, is acting on the partition unit from the inside thereof, so that as long as there continues the condition where the pressure inside the lower air chamber 12 is higher than that in the upper air chamber 14 as described hereinbefore, or as long as the gas from the inflator 20 is rectified by the diffuser 30 to be subsequently flow in, the gas continues to flow into the upper air chamber 14 from the side of the lower air chamber 12.

When the pressure of the gas inside the lower air chamber 12 in this condition drops, and the stream of the gas from the inflator 20 stops flowing, there occurs reversal in relationship between respective gas pressures acting on the inside and outside of the partition unit, that is, the pressure acting on the partition unit from the outside thereof, in other words, from the inside of the upper air chamber, becomes relatively higher than the pressure acting on a face of the partition unit, on the inside thereof, in other words, the pressure inside the lower air chamber 12, so that the interior of the partition unit collapses, thereby causing the partition faces thereof to be brought into intimate contact with one another, and the communication hole 40e to be closed (refer to FIG. 3C).

As a result, the pressure inside the upper air chamber 14 is kept substantially at a predetermined highest value, so that it is possible to sufficiently protect the head that is lighter than the waist, and needs therefore to be protected in a secured condition for a long duration.

Figure 4:
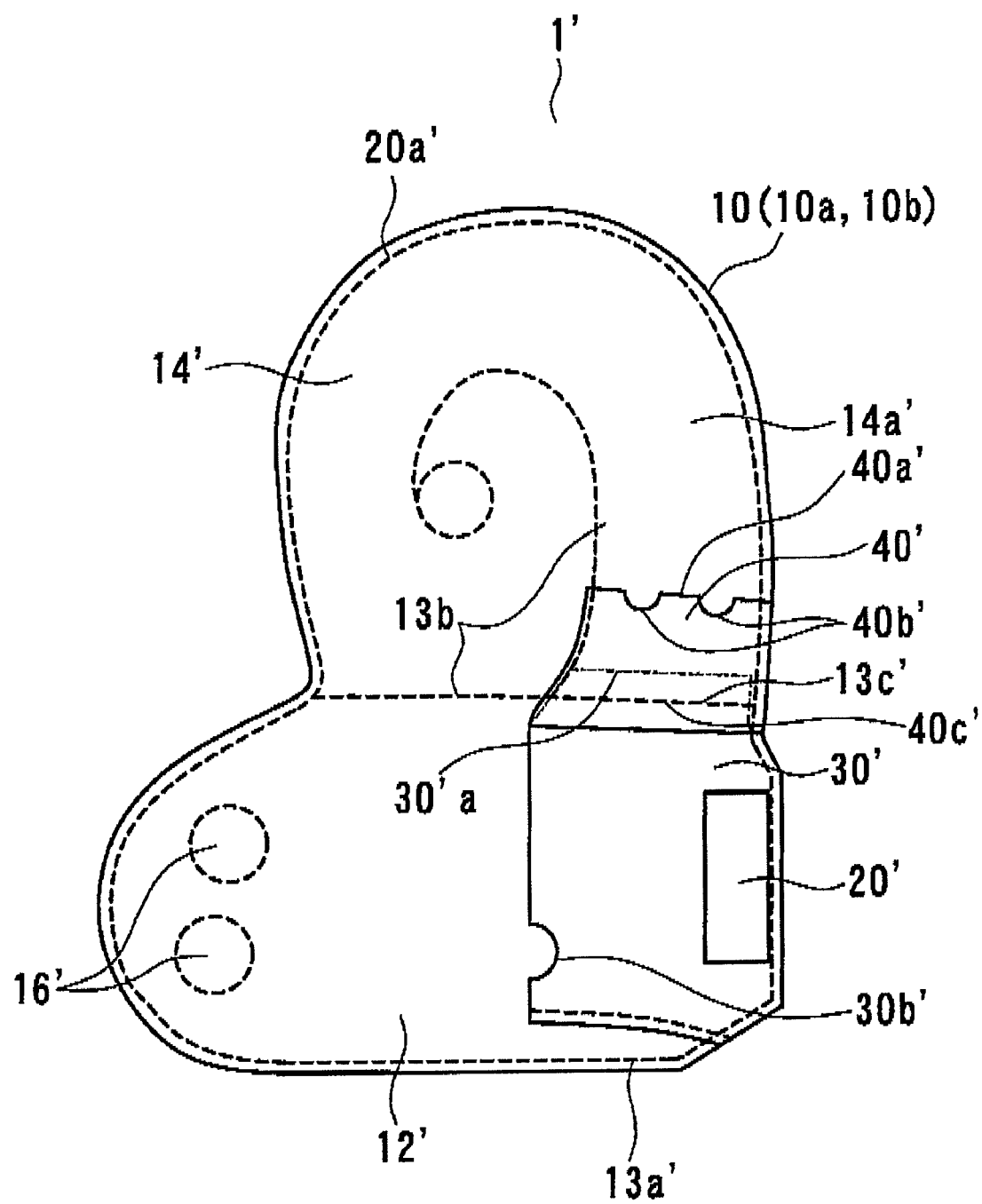
FIG. 4 is a schematic sectional view showing the whole makeup of another embodiment of an air bag device according to the present invention.

FIG. 4 is a schematic sectional view similar to FIG. 1, showing another embodiment of the present invention.

The air bag device against the side collision, according to the present embodiment, differs from that shown in FIG. 1 in that a partition unit 40' is formed integrally with a diffuser 30', so as to further reduce a component count, while a communication hole 30b' which is smaller than a communication hole 40e' is formed in a lower air chamber 12' of the diffuser 30'. Otherwise, the present embodiment is the same in makeup as the one embodiment shown in FIG. 1, and parts corresponding to those in FIG. 1 are denoted by like reference numerals with "'" affixed thereto.

In actual fabrication of the air bag device, if the partition unit 40' is formed integrally with the diffuser 30', it is impossible to sew them to both the front side face, and the back side face of a bag-like body of the air bag device, and hence there is adopted a structure wherein the upper edge portion 30'a of the diffuser 30' is fitted into the partition unit 40', thereby integrating them, however, the present embodiment includes a case where the diffuser as integrated with the partition unit is attached to both the front side face, and the back side face of the bag-like body of the air bag device by use of fastening means other than sewing, for example, by use of an adhesive, and so forth.

Although the present invention is explained by way of an example of the air bag device against a side collision, it is not always limited thereto, and also although it is explained that the air chambers are formed of the upper air chamber and the lower air chamber, they are not always limited to the upper and lower air chambers, they may be, for example, formed of front and rear air chambers.

Further, although the partition unit is provided inside the tubular air chambers 14a and 14a' for partitioning the upper air chambers 14, 14' according to the embodiment described above, the entire cloths on both the front side face, and the back side face for forming the air bag can be partitioned by the partition units 40, 40' without providing tubular air chambers 14a and 14a'.

Still further, the second air chamber of the present invention is not always limited to one, but it may be formed of plural of air chambers, and the partition unit can be provided between respective air chambers.

INDUSTRIAL APPLICABILITY

The present invention is useful as the air bag of the vehicle.

The invention claimed is:

1. An air bag device comprising;
an inflator for generating gas in emergency situations so as to be expanded and spread out by generated gas, an air bag comprising base cloths having peripheral edges which have been joined together along a seam at said peripheral edges to form a top face side and rear face side thereof, said base cloths being further joined together along a branching line extending from said peripheral edges and defining an opening where said base cloths are not joined, to further form a first air chamber provided with the inflator and a second air chamber that is coupled to the first chamber via the opening, and a partition cloth having a pair of opposed ends, each end joined to a respective one of said base cloths proximate the opening interposed between the first and second air chambers, and having a folded portion disposed toward the second air chamber, said partition cloth forming a partition unit joined to said base cloth on the top face side and rear face side thereof at portions other than the folded side portion of the partition cloth, wherein the partition unit is provided with at least one communication hole which is closed by the partition cloth forming the partition unit owing to a difference in pressure between the first and second air chambers, wherein the first chamber is oriented to extend laterally from an aft to a fore position with respect to a vehicle and the second chamber is disposed above the first chamber and is oriented to extend longitudinally from a lower to an upper position with respect to the vehicle, and wherein an exhaust port is provided in the first air chamber.

2. An air bag device according to claim 1, further comprising a diffuser for rectifying flow of the gas from the inflator in the direction of the partition unit, wherein the diffuser is provided in the first air chamber, and the diffuser supplies gas to the second air chamber more than it supplies gas to the first air chamber.

3. An air bag device according to claim 2, further comprising a tubular chamber formed to define a passage within said second air chamber to which said communication holes of said partition unit are coupled.

4. An air bag device according to claim 1, the partition unit is continuously and integrally formed with a diffuser, and a second communication hole, which is smaller than the first communication hole in the partition unit, is provided in the diffuser for supplying gas to the first air chamber.

5. An air bag device according to claim 1, wherein a volume of the first air chamber is smaller than a volume of the second air chamber.

6. An air bag device according to claim 1, wherein the cloths on the top face side and the rear face side forming the air bag are sewn to one another so as to form guide paths in such a way that a stream of gas flown in the second air chamber is guided from a rear side of a vehicle of the air bag into an upper portion of the air bag, and further from the upper portion to a front portion thereof.

7. An air bag device according to claim 1, further comprising a tubular chamber formed to define a passage within said second air chamber to which said communication holes of said partition unit are coupled.

8. An air bag device according to claim 1, wherein said first air chamber is oriented to provide protection to a waist of an occupant and said second air chamber is oriented to provide protection to a head of an occupant.

9. An air bag device according to claim 8, wherein as a result of a side collision, a waist of an occupant is first protected by inflation of said first chamber and subsequently the arms, shoulder and head of the occupant are protected by further inflation of said second chamber.

\* \* \* \* \*